Patented Mar. 18, 1930

1,751,429

UNITED STATES PATENT OFFICE

GEORGE MILLER THOMSON, OF CALEDONIA, ONTARIO, CANADA, ASSIGNOR TO CANADA GYPSUM AND ALABASTINE, LIMITED, OF PARIS, ONTARIO, CANADA

REENFORCED BUILDING MATERIAL AND PROCESS OF MAKING THE SAME

No Drawing. Application filed June 20, 1927. Serial No. 200,302.

This invention relates to cementitious building materials and particularly to the reenforcing of such materials. It comprises quick-setting cementitious material and vegetable fibres, the pores or longitudinal cells of the fibre being such, when the latter is mixed with the cementitious material, that the material enters the pores and crystallizes therein and thereabout, thus producing an intimate and fixed bond of an interlocking character between the fibres and the crystals of the material. It further comprises a process wherein dry, open-pored fibres are incorporated in a slurry of cementitious material when the latter is in solution, during its hydration.

Fibrous materials have long been used for the reenforcing of cementitious materials in the form of plaster board, block, etc. This invention, however, is directed to the securing of a close inter-bonded relation between the fibres and the material.

While the invention is applicable to any quick-setting cementitious material having the properties herein referred to, it will now be described with particular reference to calcined gypsum or plaster of Paris.

When plaster of Paris is mixed with water to effect hydration, it goes into solution, but crystallization immediately commences. The crystals are needle-like, having an average length of approximately fifteen ten-thousandths of an inch. Greatest strength is obtained in the hydrated plaster of Paris when these crystals all tend to form at the same time and at the same rate, so that they interlock one with another. There is relatively little strength in the actual surface bond between the crystals. Similarly, in order to secure greatest strength from fibres introduced into the gypsum, the mass or network of small needle-like crystals must enter the surface of the individual fibres. To permit this, the fibre must be dry, its cells must be open, free from sap or resin, to such an extent, at any rate, that it will absorb the solution in which it is to be placed.

It is well known that fibrous plant materials may be treated so as to break down the resin or sap ducts and open the pores of the material. The particular method of treating the fibre, to make it suitable for use herein, is no part of the present invention. The fibrous material may, however, be steamed under pressure to open its pores and then dried.

Such dry, open-pored fibres are incorporated in and uniformly mixed with a slurry of finely pulverized plaster of Paris and water, when the plaster of Paris is in solution. From what has been said with respect to the plaster of Paris going into solution and crystallizing out upon hydration, it will be apparent that care must be taken to incorporate the fibres in the slurry at the most suitable time, since crystallization follows solution so closely. This time, however, is not at a fixed interval following the addition of water to the plaster of Paris but will be governed by the factors which influence hydration. The size of the particles, the rapidity and effectiveness of agitation and temperature employed all effect the time at which solution is most complete. Thus specific details, as to point of time at which the fibre should be added, cannot be given, but it is sufficient to say that the fibre is added at the point in the hydration when the plaster of Paris is in solution. A simple experiment in each particular installation or process of operation will indicate the point at which the plaster of Paris is most completely in solution.

Should the fibre be introduced before the plaster of Paris is substantially in solution, clear water would enter the pores or cells of the fibre and fill the same so that the solution could not later enter. Crystallization or setting occurs, as stated, after solution, consequently the addition of the fibre cannot be delayed after solution takes place. It is, however, known to those skilled in the art that crystallization or setting can be delayed and prolonged by the use of so-called retarders or by maintaining a temperature of say 70°–100° C. The use of retarders, however, tends to decrease the strength of the material.

With the fine fibres in this condition, the solution of plaster of Paris enters the pores and longitudinal cells and there the gypsum crystals form in inter-bonded relation with the fibres and one another, thus imparting maximum strength to the product. Since, as previously stated, the inter-bonded relation of the crystals is the chief factor in producing strength, it will be apparent that the inter-meshing relation of the crystals in and about the fibres and one another is a very important factor in the reenforcing of materials of this character with fibrous materials.

The amount of fibre used may vary within substantially wide limits, depending on the product desired. Fibre amounting to ten per cent by weight of the plaster of Paris has been used and five per cent has given good results.

As a specific example of the results achieved, by the use, in the manner indicated, of treated fibre of the character described, the following may be given. A batch of calcined gypsum was divided into three equal parts and each part was processed in identically the same way, except that in No. 1 no fibre of any kind was added, in No. 2 untreated fibre, to the extent of 5 per cent, by weight, was added, while in No. 3 treated fibre of the character described was added in accordance with the process herein defined. The treated material was then formed into a series of briquettes of the same dimensions for each part and the strength of each briquette was determined by the method commonly used in determining tensile strength. The following figures indicate the average strength in pounds per square inch of twelve briquettes of each series, and are given only as indicative of the increased strength imparted to the material by the present invention.

| No. | Per cent plaster of Paris | Per cent untreated fibre | Per cent treated fibre | Strength lbs. per sq. in. |
| --- | --- | --- | --- | --- |
| 1 | 100 | | | 180.1 |
| 2 | 95 | 5 | | 170.1 |
| 3 | 95 | | 5 | 194.4 |

These figures illustrate the fact that the untreated fibre tends to lower the natural strength of the hydrated plaster of Paris, whereas the treated fibre, having its pores open as above described, and introduced at such time that the solution of plaster of Paris may enter the open pores and there crystallize in the manner described, substantially increases the natural strength of the hydrated plaster of Paris.

It will be apparent that the fibrous material has greater natural tensile strength than the crystalline cementitious material and therefore, the product of this invention, produced in the manner described, has properties which greatly increase its resistance to rupture. The increased strength, however, is not due to the treatment of the fibrous material, since such treatment usually decreases the actual strength of the fibrous material. It is due, as previously stated, to the inter-bonded relation, which exists between the fibre and the crystals, and this relation is produced in the manner described, whereby the fine needle-like crystals form within the pores and about the fibre and about one another, producing the intermeshing or interbonding relation spoken of herein.

This method is applicable to the production of reenforced solid material, as well as reenforced cellular materials from plaster of Paris and such quick-setting materials.

The reenforced material so produced may be formed into blocks or boards or poured into place in building construction and allowed to set in any well known manner.

Having thus fully described my invention, what I desire to secure by Letters Patent is:—

The process of reenforcing quick setting calcined gypsum which comprises treating vegetable fibre to open the pores thereof, drying the same and adding said open pore fibre to a slurry consisting of water and said calcined gypsum when the latter is most completely in solution.

In testimony whereof I affix my signature.

GEORGE MILLER THOMSON.